(12) United States Patent
McNaughton

(10) Patent No.: US 8,446,482 B2
(45) Date of Patent: May 21, 2013

(54) IMAGE PROCESSING APPARATUS AND METHOD

(75) Inventor: Craig McNaughton, Fife (GB)

(73) Assignee: STMicroelectronics (R&D) Ltd., Marlow Bucks (GB)

( * ) Notice: Subject to any disclaimer, the term of this patent is extended or adjusted under 35 U.S.C. 154(b) by 1045 days.

(21) Appl. No.: 12/112,146

(22) Filed: Apr. 30, 2008

(65) Prior Publication Data

US 2008/0266399 A1 Oct. 30, 2008

(30) Foreign Application Priority Data

Apr. 30, 2007 (EP) .................................... 07107210

(51) Int. Cl.
*H04N 5/235* (2006.01)

(52) U.S. Cl.
USPC ...................................... 348/222.1

(58) Field of Classification Search
USPC .......... 348/207.99, 220.1, 187, 222.1, 231.2, 348/231.9, 434.1, 435.1, 436.1, 458, 459, 348/181, 231.1
See application file for complete search history.

(56) References Cited

U.S. PATENT DOCUMENTS

| | | | | |
|---|---|---|---|---|
| 7,433,525 B2 * | 10/2008 | Kim | | 382/233 |
| 7,577,981 B2 * | 8/2009 | Clynes et al. | | 725/132 |
| 8,339,415 B2 * | 12/2012 | Sekizawa | | 345/619 |
| 2003/0040820 A1 * | 2/2003 | Staver et al. | | 700/86 |
| 2003/0146855 A1 * | 8/2003 | Sullivan et al. | | 341/1 |
| 2005/0105810 A1 * | 5/2005 | Kim | | 382/238 |
| 2006/0170661 A1 * | 8/2006 | Clynes et al. | | 345/204 |
| 2006/0215703 A1 * | 9/2006 | Honda | | 370/474 |
| 2007/0002372 A1 * | 1/2007 | Sekizawa | | 358/1.15 |

FOREIGN PATENT DOCUMENTS

| | | | |
|---|---|---|---|
| EP | 1432159 A1 | 6/2004 | |
| EP | 1753244 A1 | 2/2007 | |

OTHER PUBLICATIONS

Guo Lihua et al., "Implementation of MPEG-2 Transmission Multiplexer with FPGA," ASIC, 2001. Proceedings. 4th International Conference on Oct. 23-25, 2001, Piscataway, NJ, USA, IEEE, pp. 522-525.

"Single Copy Transmit and Receive for Unconstrained Date Over Constrained Medium," IBM Technical Disclosure Bulletin, IBM Corp., NY, USA, vol. 39, No. 11, Nov. 1996, pp. 23-27.

* cited by examiner

*Primary Examiner* — Chieh M Fan
*Assistant Examiner* — Ahmed A Berhan
(74) *Attorney, Agent, or Firm* — Allen, Dyer, Doppelt, Milbrath & Gilchrist, P.A.

(57) ABSTRACT

An image processing device including an encoder processor and a decoder circuit. The encoder processor receives image data from a sensor and encodes the data with padding data if a series of bytes indicative of command sequence occur within the image data. The decoder circuit receives the image data and the padding data, and removes the padding data from within the image data.

19 Claims, 2 Drawing Sheets

IMAGE PROCESSING APPARATUS AND METHOD

FIELD OF THE INVENTION

This invention relates to an image processing apparatus and method. More particularly, but not exclusively, it relates to an image processing apparatus and method including a decoder.

BACKGROUND OF THE INVENTION

Typically, a digital camera captures image data in frames comprising active video data, line balancing data, and frame blanking data. The start and end of a frame, and the start and end of a line of active video data, is signified by a flag byte to allow synchronization of the contents lines and frames of active video data. Typical values of these flag bytes are shown in table 1.

TABLE 1

| Byte n-2 | Byte n-1 | Detect 00H in JPEG Byte n |
|---|---|---|
| XXXXXXXX | 11111111 | 00000000 |
| 1XXXXXXX | 01111111 | 00000000 |
| 11XXXXXX | 00111111 | 00000000 |
| 111XXXXX | 00011111 | 00000000 |
| 1111XXXX | 00001111 | 00000000 |
| 11111XXX | 00000111 | 00000000 |
| 111111XX | 00000011 | 00000000 |
| 1111111X | 00000001 | 00000000 |

It is possible for a series of bits to correspond to one of these flags by chance. A co-processor associated with the camera scans the serially imput frame data for data corresponding, or nearly corresponding, to these flags and inserts a padding byte after the bytes of the flag in order to prevent a reset of the frame at an incorrect point. In JPEG-8 this padding is typically "A5." The insertion of the padding byte prevents the completion of a start or end flag sequence.

However, the padding bytes disrupt the structure of the active video data file. For example, a standard VGA image is 640×480 pixels. After insertion of padding bytes, certain rows may now appear to be longer than 640 pixels. Therefore, the padding bytes may be removed from the active video data frame prior to display. Typically, in mobile telephones and other video display equipment, this is achieved by the stripping of the padding bytes from active video data using software. The use of software to strip the padding bytes delays the processing of the active video data.

The effect of the high software overhead associated with this process is that the rate of display of frames is reduced compared to a rate of image capture. For example, using a camera with a 30 frame per second (fps) capture rate for VGA that uses software processing on the image data, a display rate of approximately 7.5 fps is achievable.

The serialization of video data output from an encoder also causes a difficulty in that serialization can occur at any point within a byte due to imperfect synchronization between the encoder and decoder. This makes it possible that the flag bytes are not encoded perfectly, for example, FF 02 may appear as FE 01 due to imperfect serialization. This can result in bit shifting of image data. Accordingly, possible combinations of these bytes that can correspond to imperfect serialization of FF 02 may be checked for, further increasing software overhead.

SUMMARY OF THE INVENTION

According to a first aspect of the present invention, there is provided an image processing apparatus comprising an encoder processor and a decoder circuit. The encoder processor is arranged to receive image data from a sensor and to encode the data with padding data, should a series of bytes indicative of a command sequence occur within the image data. The decoder circuit is arranged to receive the image data and padding data, and to remove the padding data from within the image data.

The use of a dedicated hardware circuit for the removal of the padding data removes the delay in processing due to the use of software associated with current implementations. Additionally, the removal of the padding data restores the row sizes of an image to their base size for display. This enhances the quality of the image when displayed.

The decoder circuit may comprise a field programmable gate array (FPGA). The FPGA may be programmable using Very High Speed Integrated Circuit Hardware Description Language (VHDL). The padding data may comprise either, or both, of line blanking data and/or frame blanking data from a frame of video data.

The removal of blanking data from a frame of video data reduces the video data to be transferred to a display device. This allows increased speed of processing, and consequently display, at the display device. The image data may comprise data encoded using the JPEG 8 protocol.

According to a second aspect, there is provided a method of improving the quality of an image comprising processing image data using an image processing apparatus according to the first aspect and displaying an image corresponding to the post-processed image data.

The removal of padding data by the image processing apparatus restores row sizes of an image to their base size for display. This enhances the quality of the image when displayed.

According to a third aspect, there is provided an image capture device comprising an image processing apparatus according to the first aspect.

The image capture device may comprise any of the following: digital stills camera, digital video camera, mobile telephone, web-cam, endoscope, bar code reader, and biosensor.

According to a fourth aspect, there is provided a device test apparatus comprising an image capture device, an image processing apparatus according to the first aspect, and a display device. The image capture device is arranged to capture test image data and to pass the test image data to the image processing apparatus. The image processing apparatus is arranged to process the test image data and to output the test image data to the display device. The display device is arranged to display an image corresponding to the post-processed test image data.

According to a fifth aspect, there is provided a method of increasing the rate of display of an image on a display device including processing image data using an image processing apparatus according to the first aspect and displaying an image corresponding to the post-processed image data upon the display device.

According to a sixth aspect, there is provided a decoder circuit operable as the decoder circuit of the first aspect. The use of dedicated hardware circuit for the removal of padding data may remove the delay in processing due to the use of software associated with current implementations.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
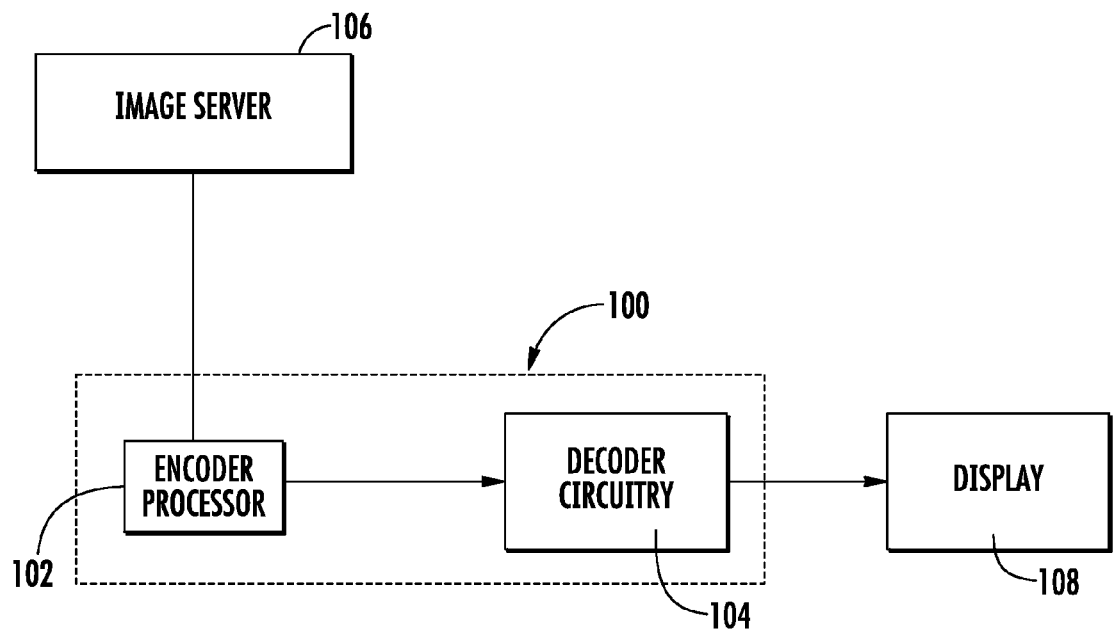
FIG. 1 is an embodiment of an image processing apparatus according to an aspect of the present invention.
Figure 2:
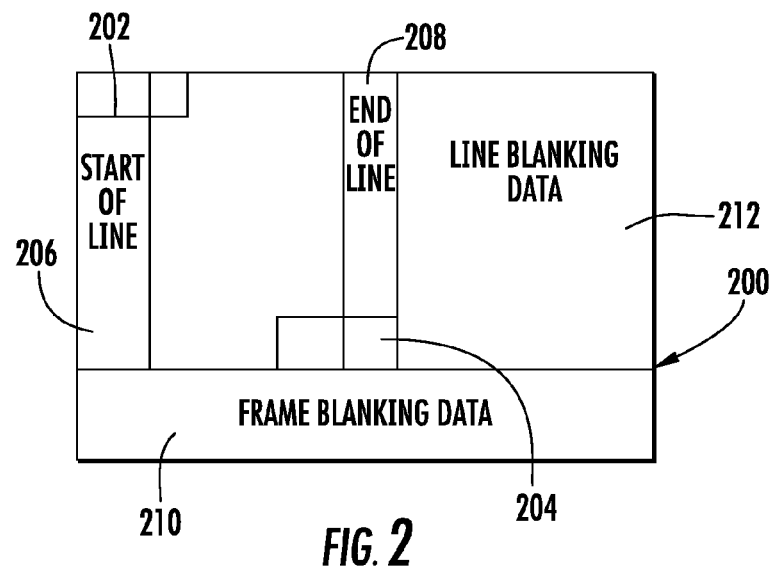
FIG. 2 is a schematic diagram of an image frame showing padding bytes, in accordance with the present invention.

Referring now to FIGS. 1 and 2, an image processing apparatus (100) comprises an encoder processor (102) and a decoder circuit (104). The encoder processor (102) receives image data from an image sensor (106). Typically, the encoder processor (102) comprises a JPEG 8 encoder and a compression control protocol encoder. Usually, the encoder processor (102) and the image sensor (106) comprise elements of a camera, for example a digital still camera or a digital video camera.

The encoder processor (102) injects bytes into the image frame data (200). In the present embodiment, the padding data comprises control data relating to the start of a frame (SOF) (202) or the end of a frame (EOF) (204), to the start of a line (SOL) (206) or the end of a line (EOL) of a frame (208), or to frame (210) or line blanking data (212). Typically, frame and line blanking data (210, 212) are used to allow such features as zoom and upscaling of images to operate.

The decoder circuit (104) is typically an FPGA, such as those supplied by Xilinx, Inc., that has been programmed using VHDL such that it scans the image data for padding data. Typically, the decoder circuit (104) checks possible bit sequences corresponding to known padding data values. In a preferred embodiment, the decoder circuit (104) checks the image data in three byte groups. This allows for the possibility of bit shifting of padding data during any serialization of the image data.

Once the decoder circuit (104) has identified padding data, it removes the padding data from the image data. The image data is then passed to a display device (108) where it is processed and displayed. Typically, the display device comprises a laptop computer, a personal computer (PC), a personal digital assistant (PDA), or a mobile telephone.

Figure 3:
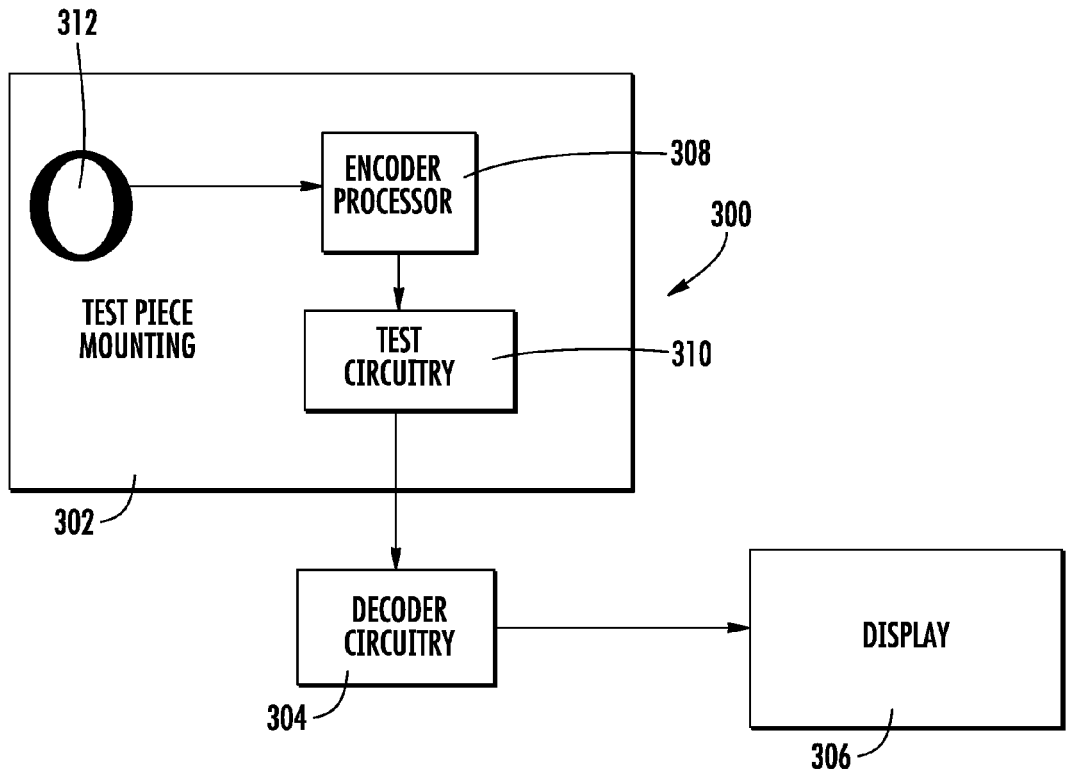
FIG. 3 is an embodiment of a device test apparatus according to another aspect of the present invention.

Referring now to FIG. 3, a device test apparatus (300) comprises a test piece mounting (302), a decoder circuit (304), and a display device (306).

The test piece mounting (302) comprises an encoder processor (308) and test circuitry (310) suitable to interface with the decoder circuit (304). The test piece mounting (302) receives an image sensor (312) for test.

In use, the image sensor (312) captures test image data which passes to the encoder processor (308) where padding data is injected into the test image data as described hereinbefore. The test image data passes to the decoder circuit (304) where the padding data is stripped out and the image data is passed for interpretation and display on the display device (306), typically a laptop computer.

Figure 4:
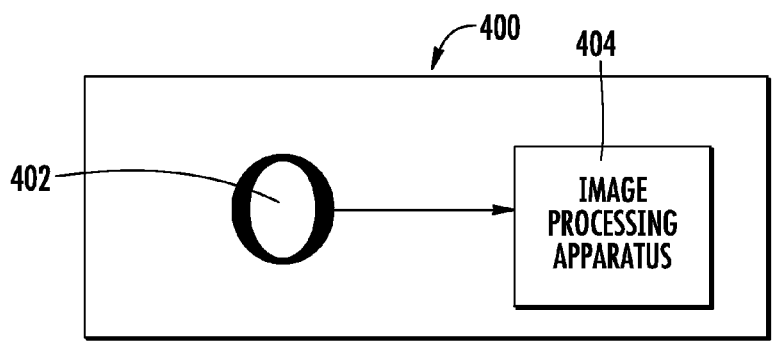
FIG. 4 is an embodiment of an image capture device according to a further aspect of the present invention.

Referring now to FIG. 4, an image capture device (400) comprises an image sensor (402) and an image processing apparatus (404) as described hereinbefore with reference to FIG. 1. Typically, the image capture device (400) may comprise a digital stills camera, digital video camera, mobile telephone, web-cam, endoscope, bar code reader, or biosensor.

While various embodiments have been described, it will be apparent to those skilled in the art once given this disclosure that various modifications, changes, improvements, and variations may be made without departing from the scope of the invention.

That which is claimed:

1. An apparatus comprising:
   an encoder processor and a decoder circuit coupled thereto;
   said encoder processor being configured to receive image data having row sizes corresponding to a base size, and to encode the image data with padding data if a series of bytes indicative of a command sequence occurs within the image data, the padding data comprising at least one of line blanking data and frame blanking data from a frame of video data and increasing the row sizes of the received image data beyond the corresponding base size;
   said decoder circuit configured to receive the encoded image data and to remove the padding data from the encoded image data to restore the row sizes to the base size for display.

2. An apparatus according to claim 1 further comprising an image sensor coupled to said encoder processor to supply image data threreto.

3. An apparatus according to claim 1 wherein said decoder circuit comprises a field programmable gate array (FPGA).

4. An apparatus according to claim 3 wherein the FPGA is programmable using Very High Speed Integrated Circuit Hardware Description Language (VHDL).

5. An apparatus according to claim 1 wherein the image data comprises data encoded using a JPEG 8 protocol.

6. An apparatus according to claim 1 wherein the apparatus is configured to define at least one of a digital still camera, digital video camera, mobile telephone, web-cam, endoscope, bar code reader, and biosensor.

7. A test apparatus comprising:
   an image capture device configured to capture test image data;
   an image processing apparatus coupled to said image capture device and comprising
     an encoder processor and a decoder circuit coupled thereto, and
     said encoder processor being configured to receive test image data having row sizes corresponding to a base size from said image capture device, and to encode the test image data with padding data if a series of bytes indicative of a command sequence occurs within the image data, the padding data comprising at least one of line blanking data and frame blanking data from a frame of video data and increasing the row sizes of the received image data beyond the corresponding base size,
     said decoder circuit configured to receive the encoded test image data and to remove the padding data from the encoded test image data to restore the row sizes to the base size for display; and
   a display coupled to said image processing apparatus.

8. A test apparatus according to claim 7 wherein said decoder circuit comprises a field programmable gate array (FPGA).

9. A test apparatus according to claim 8 wherein the FPGA is programmable using Very High Speed Integrated Circuit Hardware Description Language (VHDL).

10. A test apparatus according to claim 7 wherein the image data comprises data encoded using a JPEG 8 protocol.

11. A decoder comprising:
    circuitry configured to receive encoded image data having row sizes corresponding to a base size from an encoder processor configured to receive image data, and to encode the image data with padding data if a series of bytes indicative of a command sequence occurs within the image data, the padding data comprising at least one of line blanking data and frame blanking data from a frame of video data and increasing the row sizes of the received image data beyond the corresponding base size; and circuitry configured to remove the padding data from the encoded image data to restore the row sizes to the base size for display.

12. A decoder according to claim 11 wherein the decoder is configured to define a field programmable gate array (FPGA).

13. A decoder according to claim 12 wherein the FPGA is programmable using Very High Speed Integrated Circuit Hardware Description Language (VHDL).

14. A decoder according to claim 11 wherein the image data comprises data encoded using a JPEG 8 protocol.

15. A method comprising:

processing image data by at least configuring an encoder processor to receive image data having row sizes corresponding to a base size and to encode the image data with padding data if a series of bytes indicative of a command sequence occurs within the image data, the padding data comprising at least one of line blanking data and frame blanking data from a frame of video data and increasing the row sizes of the received image data beyond the corresponding base size, and configuring a decoder circuit to receive the encoded image data and to remove the padding data from the encoded image data to restore the row sizes to the base size for display; and displaying an image corresponding to processed image data on a display device.

16. A method according to claim 15 further comprising capturing image data with an image sensor; and wherein the encoder processor is configured to receive image data from the image sensor.

17. A method according to claim 15 wherein the decoder circuit is configured to define a field programmable gate array (FPGA).

18. A method according to claim 17 wherein the FPGA is programmable using Very High Speed Integrated Circuit Hardware Description Language (VHDL).

19. A method according to claim 15 wherein the image data comprises data encoded using a JPEG 8 protocol.

* * * * *